Patented Mar. 25, 1947

2,417,985

UNITED STATES PATENT OFFICE 2,417,985

N,N'-DIBENZYLIDENE-ETHYLENE-DIAMINE AS ARACHNICIDES

Elbert C. Ladd, Passaic, N. J., assignor to United States Rubber Company, New York, N. Y., a corporation of New Jersey No Drawing. Application June 28, 1944, Serial No. 542,612

6 Claims. (Cl. 167—30)

This invention relates to improvements in arachnicides.

I have found that N,N'-dibenzylidene-ethylenediamine is effective for control of arachnids. The term "arachnid" is used in its broad sense to include spiders, mites, ticks, and the like. The structure of N,N'-dibenzylidene-ethylenediamine may be represented as follows:

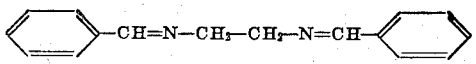

The compound and method of preparation are described in Beilstein's "Handbuch der Organischen Chemie," vol. 7, p. 214 (4th ed.). It is there called "NN'-dibenzalethylenediamine."

The N,N'-dibenzylidene-ethylenediamine may be applied diluted or undiluted, mixed with carriers, with other arachnicides, or with fungicides, insecticides, insect repellents, fertilizers, plant hormones, buffering or safening agents. It may be applied as a dust, alone or diluted with a suitable carrier, such as clay or talc, or in solution in a suitable organic solvent, or in suspension in a non-solvent, as in an aqueous medium. The N,N'-dibenzylidene-ethylenediamine may be used to control Arachnida of the order which infest plants, such as red spider, brown mite, European red mite, citrus red mite, and also those which infest man, domestic animals, fowls, etc.

The following example illustrates the invention by the killing action of N,N'-dibenzylidene-ethylenediamine on *Tetranychus telarius*, commonly known as red spider. In these tests aqueous suspensions of .125, .25 and .5% of N,N'-dibenzylidene-ethylenediamine were prepared with .25% of Nacconal NR, a proprietary dispersing agent which is a sulfonated condensation product of chlorinated kerosene with benzene. Young bean plants, with first true leaves fully expanded, were heavily infested with red spider, and then sprayed with the aqueous suspensions of N,N'-dibenzylidene-ethylenediamine. Insect counts were taken after 72 hours. Control plants were sprayed with water containing .25% of Nacconal NR but no other added chemical. The results of the insect counts are shown in the following table and illustrate the great potency of N,N'-dibenzylidene-ethylenediamine as an arachnicide.

| Percent N,N'-dibenzylidene-ethylenediamine in Aqueous Suspension | Percent Dead after 72 Hours | |
|---|---|---|
|  | Treated Plants | Control |
| .5 | 97 | 5 |
| .25 | 95 | 10 |
| .125 | 48 | 10 |

It may be seen from the above that N,N'-dibenzylidene-ethylenediamine is an effective arachnicide.

Having thus described my invention, what I claim and desire to protect by Letters Patent is:

1. An arachnicidal preparation comprising an aqueous suspension of N,N'-dibenzylidene-ethylenediamine containing a dispersing agent.

2. An arachnicidal preparation comprising N,N'-dibenzylidene-ethylenediamine as an essential ingredient, and a carrier therefor selected from the group consisting of clay, talc, and water containing a dispersing agent.

3. The method of protecting plants subject to attack by arachnids which comprises applying N,N'-dibenzylidene-ethylenediamine to said plants.

4. The method of protecting plants subject to attack by arachnids which comprises spraying said plants with an aqueous suspension of N,N'-dibenzylidene-ethylenediamine.

5. The method which comprises applying N,N'-dibenzylidene-ethylenediamine to loci to be protected against arachnids.

6. The method of controlling arachnids which comprises treating the arachnids with N,N'-dibenzylidene-ethylenediamine.

ELBERT C. LADD.